May 9, 1944.  A. J. G. CHANDLER  2,348,449
CONTAINER DELIVERING ARTICLES SINGLY
Filed Jan. 16, 1942  2 Sheets-Sheet 1
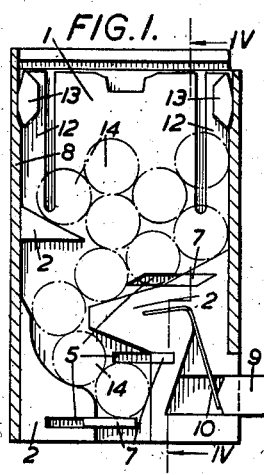
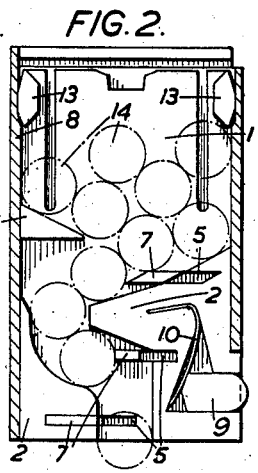
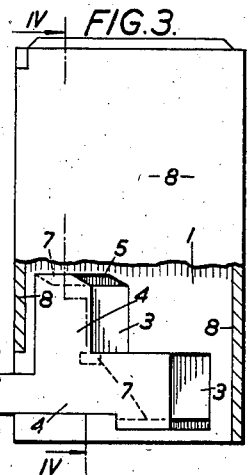
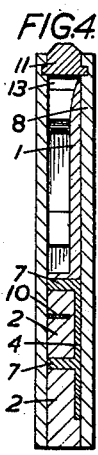
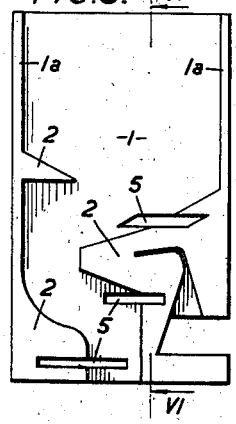
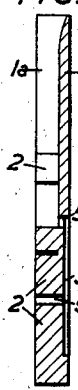
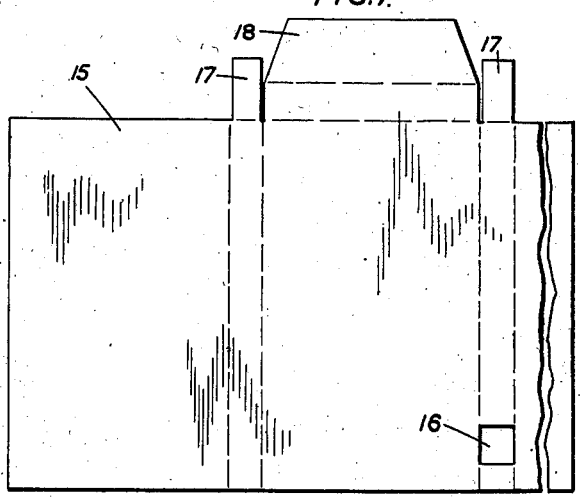
INVENTOR
Alfred J. G. Chandler
BY
ATTORNEYS May 9, 1944.    A. J. G. CHANDLER    2,348,449
CONTAINER DELIVERING ARTICLES SINGLY
Filed Jan. 16, 1942    2 Sheets-Sheet 2
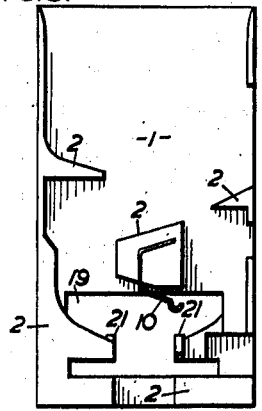
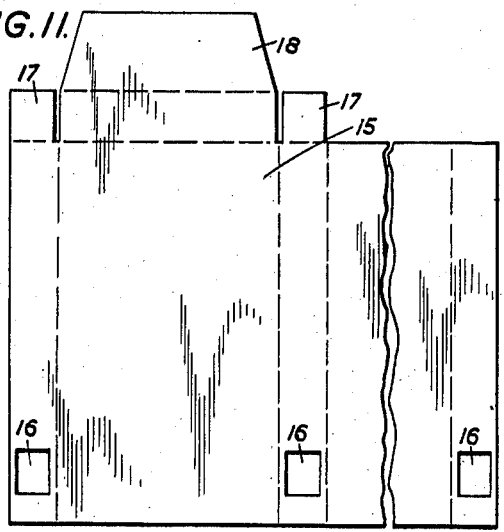
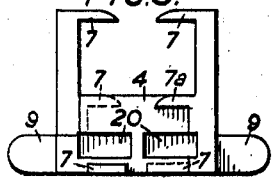
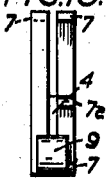
INVENTOR
Alfred J. G. Chandler
BY
Munn, Liddy, Glaccum & Kane
ATTORNEYS Patented May 9, 1944

2,348,449

UNITED STATES PATENT OFFICE 2,348,449

CONTAINER DELIVERING ARTICLES SINGLY

Alfred John George Chandler, London, England

Application January 16, 1942, Serial No. 427,027
In Great Britain March 28, 1941

4 Claims. (Cl. 312—89)

This invention relates to containers for holding articles such, for example, as tablets, pellets, capsules or other small similar articles which will slide or roll and for delivering them singly.

The invention includes arrangements in which a reciprocating member is used to control articles presented to the operative parts in a single layer and finally moving in succession along a predetermined path, the reciprocating member having projections of which one moves across a final exit passage to obstruct or free it, one engages and checks the following article approaching the exit passage down a slope and preferably a third moves out among the body of articles ready to come into succession as they approach the exit, checking any tendency to jam and ensuring a proper sequence.

In typical arrangements, lending themselves readily to manufacture from plastic material, there is formed at the lower end of the container a slope from one side, to the other which forms the bottom of a sloping passage leading the contents in a single line to the opposite side. The passage then takes a return slope and terminates in a vertical exit passage. The operating member has a piece projecting through the side of the container and forming a knob so that it can be operated by finger pressure and a suitable spring and has operating projections which co-operate with and act upon articles in the passages. One projection moves across the exit passage to obstruct or free it, one moves from above the exit passage into the return slope to engage and check the following article as the exit passage is freed and preferably a third moves out from the bottom of the continuing slope and just disturbs the mass of articles above to check any tendency to jam and ensure a sequence of movement.

Some such typical arrangements are illustrated by the accompanying drawings in which—

Figs. 1 and 2 are sectional front elevations showing the operation of the parts, Fig. 3 is a partly sectional back elevation, Fig. 4 is a section on the line IV—IV of Figs. 1 and 3, Fig. 5 is a front elevation and Fig. 6 a cross section on the line VI—VI of Fig. 5 showing an alternative form of body part;

Fig. 7 represents a form of enclosure suitable for use with the body part of Figs. 5 and 6, Fig. 8 is a front elevation of a further alternative form of body part, Figs. 9 and 10 are a front and a side elevation of an operating part adapted to co-operate with the body part of Fig. 8, and Fig. 11 represents a form of enclosure suitable for use with the parts of Figs. 8 to 10.

The operation is in each case substantially the same. Referring first to Figs. 1 to 4, a plate 1 is moulded with projecting parts 2 upon one face to form the passages as described above and is recessed at 3 in the opposite face to form a slideway for the operating slide 4. Slots 5 through the plate 1 allow for the operative projections 7 of the slide 4 to co-operate in the passages. A sleeve-like enclosure 8 will then serve to complete the container and to retain the slide, the projections of the plate 1 occupying the thickness of the sleeve and allowing the knob 9 to project through an opening in the enclosure 8. The enclosure 8 in conjunction with the walls of the recess 3 provide bearing surfaces for the slide 4. The knob 9 can conveniently occupy substantially the whole thickness, and one of the projecting parts 2 can be formed to house a suitable return spring 10. As shown at Figs. 1 to 4 the enclosure is completed by a moulded sleeve part 8 with a sliding lid 11, slots being formed in the plate 1 to form slightly springy arms 12 with retaining projections 13 to retain the sleeve. The lid 11 may be removed to fill the container or used to push the plate out of the sleeve when desired.

It will be apparent from Figs. 1 and 2 that upon pressing the knob 9 an article 14 lying in the exit passage is released and emerges, the next article in succession is held in the return slope and a projection 7 emerges from the floor of the upper slope and slightly lifts the main mass of articles 14 in the upper part of the box, all as shown in Fig. 2. Upon the return stroke to the position of Fig. 1, the exit passage is closed and the front article in the return slope freed to fall into it, while the withdrawal of the projection from the floor of the upper slope disturbs the main mass by allowing a general fall at that point and encourages the articles resting on that slope to proceed downwards in their proper sequence.

The operation and the general form of the parts are similar in the form of Figs. 5, 6 and 7, but the main plate or body member 1 is formed with side flanges 1a so that the enclosure of the container can be easily completed by a cardboard or like wrapper 15, wrapped round and secured by adhesive, leaving the knob 9 protruding through the aperture 16. The contents can be placed in position beforehand and the tongues 17 and flap 18 also stuck if desired, or the tongues and flap may be left unsecured to give access.

The form of Figs. 8, 9, 10 and 11 is also similar except that the operating parts are duplicated upon the two faces of the plate or body member so that the delivery stroke upon one side is the return stroke on the other. The spring 10 operates upon the upper surface of one (7a) of the projections, somewhat after the manner of a well-known form of electrical switch. A layer of articles is retained upon each side of the plate and each stroke releases an article alternately from opposite sides of the plate. The plate is slotted at 19 to receive and guide the operating member, which is itself slotted at 20 to accommodate the pins or stops 21 which represent one side of the passage leading to the exit. As illustrated, this form also can be enclosed by a wrapper 15 (Fig. 11), leaving the knobs 9 protruding through the apertures 16.

It will be apparent that the sleeve cover in each form illustrated helps to house and guide the operating member but that plate 1 might in some cases form the sole guide for the operating member and define the passages respectively, the device being in such cases more easily formed by placing one part directly upon the other. The forms described, however, lend themselves very well to manufacture of the two operative parts from plastic material by moulding them with the necessary projections; and the enclosure can be completed in various ways.

I claim:

1. In a container for delivering tablets, pellets, capsules and like articles, the combination of means to present the articles to the operative parts in a single layer, comprising a sloping approach passage of size to pass the articles only singly in succession, a final exit passage, and a reciprocatable member to control the progress of the articles, the said reciprocatable member having projections whereof one moves across the final exit passage to obstruct or free it and a second engages and checks following articles approaching the exit passage down the approach passage, the container having a partition plate and the said parts being duplicated in reverse upon each side of the plate and upon the reciprocatable member and so arranged that the delivery stroke of a reciprocating member upon one side of the plate is its return stroke upon the other.

2. In a container for delivering tablets, pellets, capsules and like articles, the combination of means to present the articles to the operative parts in a single layer, comprising a sloping approach passage of size to pass the articles only singly in succession, a much steeper final exit passage, and a reciprocatable member to control the progress of the articles, the said reciprocatable member having projections thereon whereof one moves laterally across the final exit passage to obstruct or free it and a second engages frontally and checks following articles approaching the exit passage down the approach passage, while a third moves out among the body of articles ready to come into single succession, checking any tendency to jam, the container having a partition plate and the said parts being duplicated in reverse upon each side of the plate and upon the reciprocatable member and so arranged that the delivery stroke of a reciprocating member upon one side of the plate is its return stroke upon the other.

3. A container for delivering tablets, pellets, capsules and like articles, having in combination a main plate upon one side of which are formed projections which define, in part, a passage-way for the articles, a reciprocatable member having projections thereon which control the progress of the articles and whereof one is a checking member, a return spring, said passage-way being so angularly related to the path of the checking member and of such size relatively to that of the articles as to present the article next above the lowermost more or less frontally to the path of the checking member, the said main plate being also formed with slots for the accommodation of the projections on said reciprocatable member, bearing surfaces for said reciprocatable member, and a return-spring housing; and the said projections upon the reciprocatable member operating through the said slots in the said main plate, and a sleeve-like member which covers the aforementioned passage-way, slots, bearing surfaces and housing.

4. A dispensing device comprising a casing constructed to provide a chamber for a supply of articles to be dispensed, said chamber having a sloping bottom wall, a sloping passage leading downwardly in the chamber at one end of said wall so as to receive said articles one at a time from said bottom wall, a vertical exit passage in continuation of the sloping passage and leading downwardly therefrom, a slide movable between a normal withdrawn position and an advanced position, said slide having spaced projections to control the sloping and exit passages respectively, said projections extending laterally from one broad side face of the slide, and said casing structure having guide slots therein in which said projections move respectively, and resilient means to move the slide to its withdrawn position, the provision and arrangement of parts being such that when the slide is moved to the advanced position the first of said projections will clear the exit passage to dispense a single article, while the second projection checks the succeeding article, and when the slide is moved to the withdrawn position the exit passage will be closed by the first projection and the second projection will be clear of the sloping passage to uncheck and allow the succeeding article to drop onto the first projection.

ALFRED J. G. CHANDLER.